(12) United States Patent
Cho et al.

(10) Patent No.: US 11,768,792 B2
(45) Date of Patent: Sep. 26, 2023

(54) SIGNAL RECEIVER AND ELECTRONIC APPARATUS INCLUDING THE SAME

(71) Applicant: LG ELECTRONICS INC., Seoul (KR)

(72) Inventors: Youngjoo Cho, Seoul (KR); Jihyun Kim, Seoul (KR); Eunji Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/904,902

(22) PCT Filed: Feb. 27, 2020

(86) PCT No.: PCT/KR2020/002824
§ 371 (c)(1),
(2) Date: Aug. 24, 2022

(87) PCT Pub. No.: WO2021/172622
PCT Pub. Date: Sep. 2, 2021

(65) Prior Publication Data
US 2023/0109740 A1   Apr. 13, 2023

(51) Int. Cl.
*G06F 13/40* (2006.01)
(52) U.S. Cl.
CPC .............................. *G06F 13/4059* (2013.01)
(58) Field of Classification Search
CPC ...... G06F 13/4059; G06F 13/40; G06F 13/10; G06F 13/38; G09G 3/36; H03K 19/0185;
(Continued)

(56) References Cited

U.S. PATENT DOCUMENTS

2014/0168197 A1* 6/2014 Kobayashi ........... G09G 3/2096
345/212
2017/0032757 A1* 2/2017 Itoigawa ................ G09G 5/008
(Continued)

FOREIGN PATENT DOCUMENTS

| CN | 109286396 | 1/2019 |
| JP | 2017-026936 | 2/2017 |

(Continued)

OTHER PUBLICATIONS

PCT International Application No. PCT/KR2020/002824, International Search Report dated Nov. 17, 2020, 4 page.

*Primary Examiner* — Phong H Dang
(74) *Attorney, Agent, or Firm* — LEE, HONG, DEGERMAN, KANG & WAIMEY PC

(57) ABSTRACT

A signal receiver and an electronic apparatus including the same are disclosed. A signal receiver according to an embodiment of the present disclosure includes a first input interface to output a first type signal, second to fourth input interfaces to output the first type signal or the second type signal, a first buffer electrically connected to the first and the second input interfaces, a second buffer electrically connected to the second and the third input interfaces, a third buffer electrically connected to the third and the fourth input interfaces, and a fourth buffer electrically connected to the fourth and the second input interfaces. Accordingly, it is possible to simply implement a circuit for receiving a plurality of types of signals.

20 Claims, 12 Drawing Sheets

(58) Field of Classification Search
CPC ............ H03K 19/21; H04B 1/16; H04B 3/04; H04M 1/725
See application file for complete search history.

(56) References Cited

U.S. PATENT DOCUMENTS

2017/0286327 A1* 10/2017 Zhang ................. G06F 13/4068
2018/0159552 A1*  6/2018 Kim ................. H03K 19/17744
2020/0244257 A1*  7/2020 Ji ........................... H03K 19/02
2022/0365897 A1* 11/2022 Jennings ............. G06F 13/4027
2022/0397932 A1* 12/2022 Kim .................... G06F 13/4004

FOREIGN PATENT DOCUMENTS

KR    2018-0065119    6/2018
WO    2019-125730     6/2019

* cited by examiner

SIGNAL RECEIVER AND ELECTRONIC APPARATUS INCLUDING THE SAME

CROSS-REFERENCE TO RELATED APPLICATION(S)

This application is the National Stage filing under 35 U.S.C. 371 of International Application No. PCT/KR2020/002824, filed on Feb. 27, 2020, the contents of which is hereby incorporated by reference herein in its entirety.

1. Field of the Disclosure

The present disclosure relates to a signal receiver and an electronic apparatus including the same, and more specifically, to a receiver capable of simply implementing a circuit for receiving a plurality of types of signals, and an electronic apparatus including the same.

Further, the present disclosure relates to a signal receiver and an electronic apparatus including the same, and more specifically, to a signal receiver capable of simply implementing a circuit for receiving a plurality of types of signals without an additional switching element, and an electronic apparatus including the same.

2. Description of the Related Art

In electronic apparatuses, various interfaces are used between internal circuits for wired data transmission and reception, and the like.

For example, an interface for mobile industry processor interface (MIPI) communication is used for mobile terminals.

For MIPI communication, C-PHY and D-PHY types have been interchangeably used recently.

When C-PHY and D-PHY types are interchangeably used for MIPI communication, it is desirable to use an interface circuit to which standards for both types are applicable during signal transmission and reception between devices.

To this end, an interface circuit in a signal receiver includes a plurality of input interfaces and a plurality of buffers, and for an operation according to reception of signals for C-PHY and D-PHY, needs to include an additional circuit or switching element for selecting a received signal between the plurality of buffers, and the circuit becomes complicated.

SUMMARY

It is an object of the present disclosure to provide a signal receiver capable of simply implementing a circuit for receiving a plurality of types of signals, and an electronic apparatus including the same.

It is another object of the present disclosure to provide a signal receiver capable of simply implementing a circuit for receiving a plurality of types of signals without an additional switching element, and an electronic apparatus including the same.

It is yet another object of the present disclosure to provide a signal receiver capable of implementing an interface module having excellent scalability, and an electronic apparatus including the same.

In accordance with an aspect of the present disclosure, the above and other objects can be accomplished by providing a signal receiver and an electronic apparatus including the same, including a first input interface configured to output a first type signal between the first type signal and a second type signal, second to fourth input interfaces configured to output the first type signal or the second type signal, a first buffer electrically connected to the first input interface and the second input interface, a second buffer electrically connected to the second input interface and the third input interface, a third buffer electrically connected to the third input interface and the fourth input interface, and a fourth buffer electrically connected to the fourth input interface and the second input interface.

Meanwhile, one wire is connected to an output terminal of each of the first to fourth input interfaces.

Meanwhile, each of the first to fourth buffers each includes a first input terminal and a second input terminal, and one wire is connected to each of the first input terminal and the second input terminal.

Meanwhile, a first node between the second input interface and the second buffer is electrically connected to the first input interface, a second node between the second input interface and the second buffer is electrically connected to the fourth input interface, a third node between the third input interface and the third buffer is electrically connected to the second input interface, and a fourth node between the fourth input interface and the fourth buffer is electrically connected to the third input interface.

Meanwhile, in response of operation in a first type mode based on the first type signal, the first to fourth input interfaces output the first type signal, the first buffer and the third buffer operate, and the second buffer and the fourth buffer do not operate.

Meanwhile, in response of operation in a second type mode based on the second type signal, the second to fourth input interfaces output the second type signal, the second to fourth buffers operate, and the first buffer does not operate.

Meanwhile, the signal receiver and the electronic apparatus including the same according to an embodiment of the present disclosure may include a plurality of interface modules each including the first to fourth input interfaces and the first to fourth buffers.

Meanwhile, two resistor elements and two switching elements are symmetrically connected between the first input terminal and the second input terminal of each of the first to third buffers, and one resistor element and one switching element are connected to the first input terminal of the fourth buffer.

Meanwhile, a capacitor is connected between a node between the first input terminal and the second input terminal of each of the first to fourth buffers and a ground terminal.

Meanwhile, two resistor elements and two switching elements are symmetrically connected Between the first input terminal and the second input terminal of each of the first to fourth buffers.

Meanwhile, a capacitor is connected between a node between the first input terminal and the second input terminal of each of the first to fourth buffers and the ground terminal.

In accordance with another aspect of the present disclosure, the above and other objects can be accomplished by providing a signal receiver and an electronic apparatus including the same, the signal receiver including first to fourth buffers each including a first input terminal and a second input terminal, a first input interface configured to output a first type signal between the first type signal and a second type signal to the first buffer, and second to fourth input interfaces configured to output the first type signal or the second type signal to the second to fourth buffers, respectively, wherein two of the first to fourth buffers operate in response of operation in a first type mode based on the first type signal, and three of the first to fourth buffers operate in response of operation in a second type mode based on the second type of signal.

Meanwhile, the first buffer and the third buffer operate and the second buffer and the fourth buffer do not operate in response of operation in the first type mode based on the first type signal, and the second to fourth buffers operate and the first buffer does not operate in response of operation in the second type mode based on the second type signal.

Meanwhile, the first buffer and the third buffer may output the first type signal, and the second to fourth buffers may output the second type signal.

Effects of the Disclosure

A signal receiver and an electronic apparatus including the same according to an embodiment of the present disclosure include a first input interface configured to output a first type signal between the first type signal and a second type signal, second to fourth input interfaces configured to output the first type signal or the second type signal, a first buffer electrically connected to the first input interface and the second input interface, a second buffer electrically connected to the second input interface and the third input interface, a third buffer electrically connected to the third input interface and the fourth input interface, and a fourth buffer electrically connected to the fourth input interface and the second input interface. Accordingly, it is possible to simply implement a circuit for receiving a plurality of types of signals. In particular, it is possible to simply implement a circuit for receiving a plurality of types of signals without separate switching elements.

Meanwhile, one wire is connected to an output terminal of each of the first to fourth input interfaces. Accordingly, it is possible to simply implement a circuit for receiving a plurality of types of signals.

Meanwhile, each of the first to fourth buffers each includes a first input terminal and a second input terminal, and one wire is connected to each of the first input terminal and the second input terminal. Accordingly, it is possible to simply implement a circuit for receiving a plurality of types of signals.

Meanwhile, a first node between the second input interface and the second buffer is electrically connected to the first input interface, a second node between the second input interface and the second buffer is electrically connected to the fourth input interface, a third node between the third input interface and the third buffer is electrically connected to the second input interface, and a fourth node between the fourth input interface and the fourth buffer is electrically connected to the third input interface. Accordingly, it is possible to simply implement a circuit for receiving a plurality of types of signals.

Meanwhile, in response of operation in a first type mode based on the first type signal, the first to fourth input interfaces output the first type signal, the first buffer and the third buffer operate, and the second buffer and the fourth buffer do not operate. Accordingly, it is possible to simply implement a circuit for receiving a plurality of types of signals.

Meanwhile, in response of operation in a second type mode based on the second type signal, the second to fourth input interfaces output the second type signal, the second to fourth buffers operate, and the first buffer does not operate. Accordingly, it is possible to simply implement a circuit for receiving a plurality of types of signals.

Meanwhile, the signal receiver and the electronic apparatus including the same according to an embodiment of the present disclosure may include a plurality of interface modules each including the first to fourth input interfaces and the first to fourth buffers. Accordingly, it is possible to implement a signal processing device having an interface module having excellent scalability.

Meanwhile, two resistor elements and two switching elements are symmetrically connected between the first input terminal and the second input terminal of each of the first to third buffers, and one resistor element and one switching element are connected to the first input terminal of the fourth buffer. Accordingly, it is possible to simply implement a circuit for receiving a plurality of types of signals.

Meanwhile, a capacitor is connected between a node between the first input terminal and the second input terminal of each of the first to fourth buffers and a ground terminal. Accordingly, it is possible to simply implement a circuit for receiving a plurality of types of signals.

Meanwhile, two resistor elements and two switching elements are symmetrically connected Between the first input terminal and the second input terminal of each of the first to fourth buffers. Accordingly, it is possible to simply implement a circuit for receiving a plurality of types of signals.

Meanwhile, a capacitor is connected between a node between the first input terminal and the second input terminal of each of the first to fourth buffers and the ground terminal. Accordingly, it is possible to simply implement a circuit for receiving a plurality of types of signals.

In accordance with another aspect of the present disclosure, the above and other objects can be accomplished by providing a signal receiver and an electronic apparatus including the same, the signal receiver including first to fourth buffers each including a first input terminal and a second input terminal, a first input interface configured to output a first type signal between the first type signal and a second type signal to the first buffer, and second to fourth input interfaces configured to output the first type signal or the second type signal to the second to fourth buffers, respectively, wherein two of the first to fourth buffers operate in response of operation in a first type mode based on the first type signal, and three of the first to fourth buffers operate in response of operation in a second type mode based on the second type of signal. Accordingly, it is possible to simply implement a circuit for receiving a plurality of types of signals. In particular, it is possible to simply implement a circuit for receiving a plurality of types of signals without separate switching elements.

Meanwhile, the first buffer and the third buffer operate and the second buffer and the fourth buffer do not operate in response of operation in the first type mode based on the first type signal, and the second to fourth buffers operate and the first buffer does not operate in response of operation in the second type mode based on the second type signal. Accordingly, it is possible to simply implement a circuit for receiving a plurality of types of signals.

Meanwhile, the first buffer and the third buffer may output the first type signal, and the second to fourth buffers may output the second type signal. Accordingly, it is possible to simply implement a circuit for receiving a plurality of types of signals.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
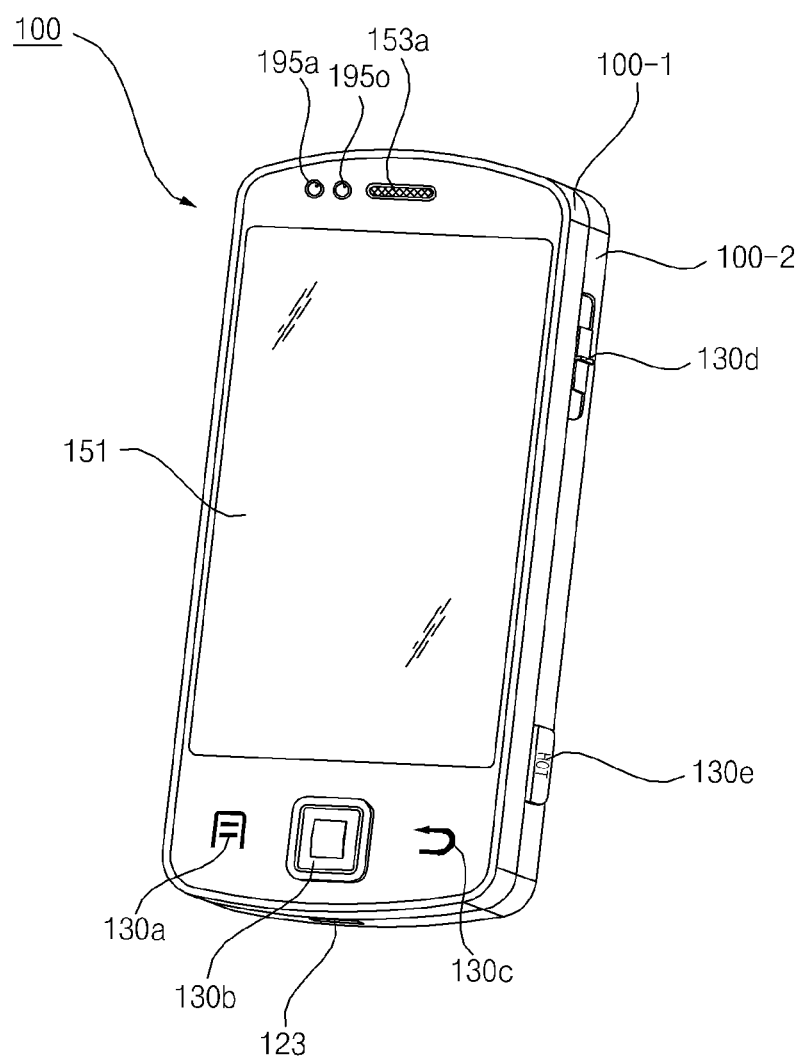
FIG. 1A is a perspective view of a mobile terminal as an example of an electronic apparatus according to an embodiment of the present disclosure.
Figure 1B:
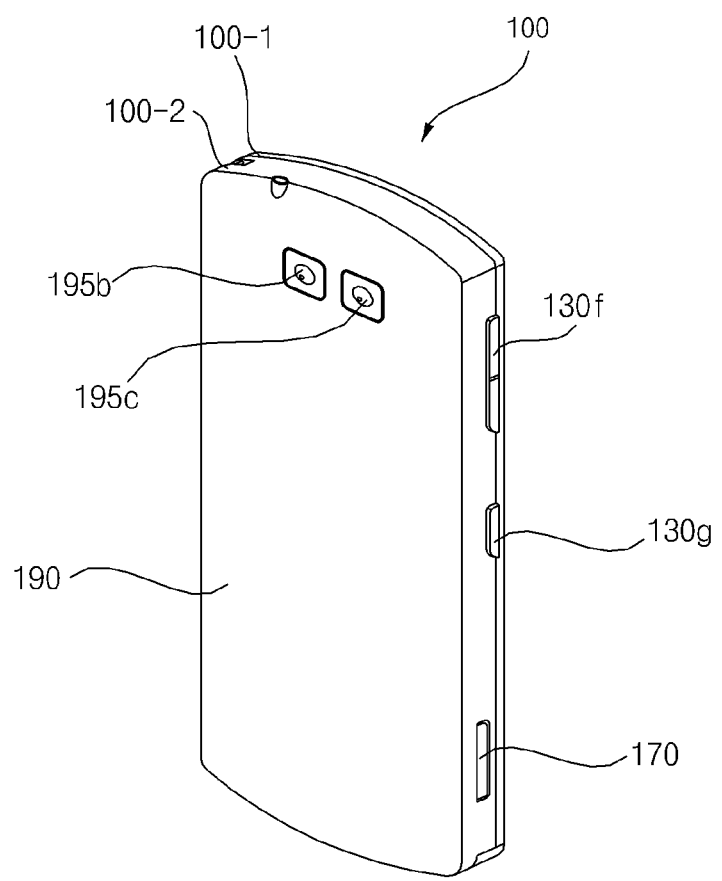
FIG. 1B is a rear perspective view of a mobile terminal shown in FIG. 1A.

FIG. 1A is a perspective view of a mobile terminal as an example of an electronic apparatus according to an embodiment of the present disclosure, and FIG. 1B is a rear perspective view of a mobile terminal shown in FIG. 1A.

Referring to FIG. 1A, a case forming an outer appearance of a mobile terminal 100 may be formed by a front case 100-1 and a rear case 100-2. Various electronic elements may be embedded in a space formed by the front case 100-1 and the rear case 100-2.

Specifically, a display 180, a first sound output device 153a, a first camera device 195a, a second camera device 195o, and a first to third user input devices 130a, 130b, and 130c may be disposed in the front case 100-1. Further, a fourth user input device 130d, a fifth user input device 130e, and a microphone 123 may be disposed on a lateral surface of the rear case 100-2.

In the display 180, a touchpad may be overlapped in a layer structure so that the display 180 may operate as a touch screen.

The first sound output device 153a may be implemented in the form of a receiver or a speaker. The first camera device 195a may be implemented in a form suitable for photographing an image or a moving image of a user, and the like. The microphone 123 may be implemented in a form suitable for receiving a user's voice, other sounds, and the like.

The first to fifth user input devices 130a, 130b, 130c, 130d and 130e and a sixth and seventh user input devices 130f and 130g described below may be collectively referred to as a user input device 130.

The microphone 123 may be disposed in the lower side of the rear case 100-2, i.e., in the lower side of the mobile terminal 100, so as to collect an audio signal. Otherwise the microphone 123 may be disposed in the upper side of the rear case 100-2, i.e., in the upper side of the mobile terminal 100, so as to collect an audio signal.

Referring to FIG. 1B, a third camera device 195b, a fourth camera device 195c, and a fourth microphone (not shown) may be additionally mounted on the rear surface of the rear case 100-2, and a sixth and seventh user input devices 130f and 130g, and an interface 175 may be disposed on the lateral surface of the rear case 100-2.

The third camera device 195b has a photographing direction substantially opposite to that of the first camera device 195a, and may have different pixels from the first camera device 195a. A flash (not shown) and a mirror (not shown) may be additionally disposed adjacent to the third camera device 195b. In addition, another camera device may be installed adjacent to the third camera device 195b to be used for shooting a three-dimensional stereoscopic image.

A second sound output device (not shown) may be additionally disposed in the rear case 100-2. The second sound output device may implement a stereo function together with the first sound output device 153a, and may be used for talking in a speakerphone mode.

A power supply 190 for supplying power to the mobile terminal 100 may be mounted in the rear case 100-2. The power supply 190 may be, for example, a rechargeable battery and may be detachably coupled to the rear case 100-2 for charging or the like.

The microphone 123 may be disposed in the front surface of the rear case 100-2, i.e., in the rear surface of the mobile terminal 100 so as to collect an audio signal.

Figure 2:
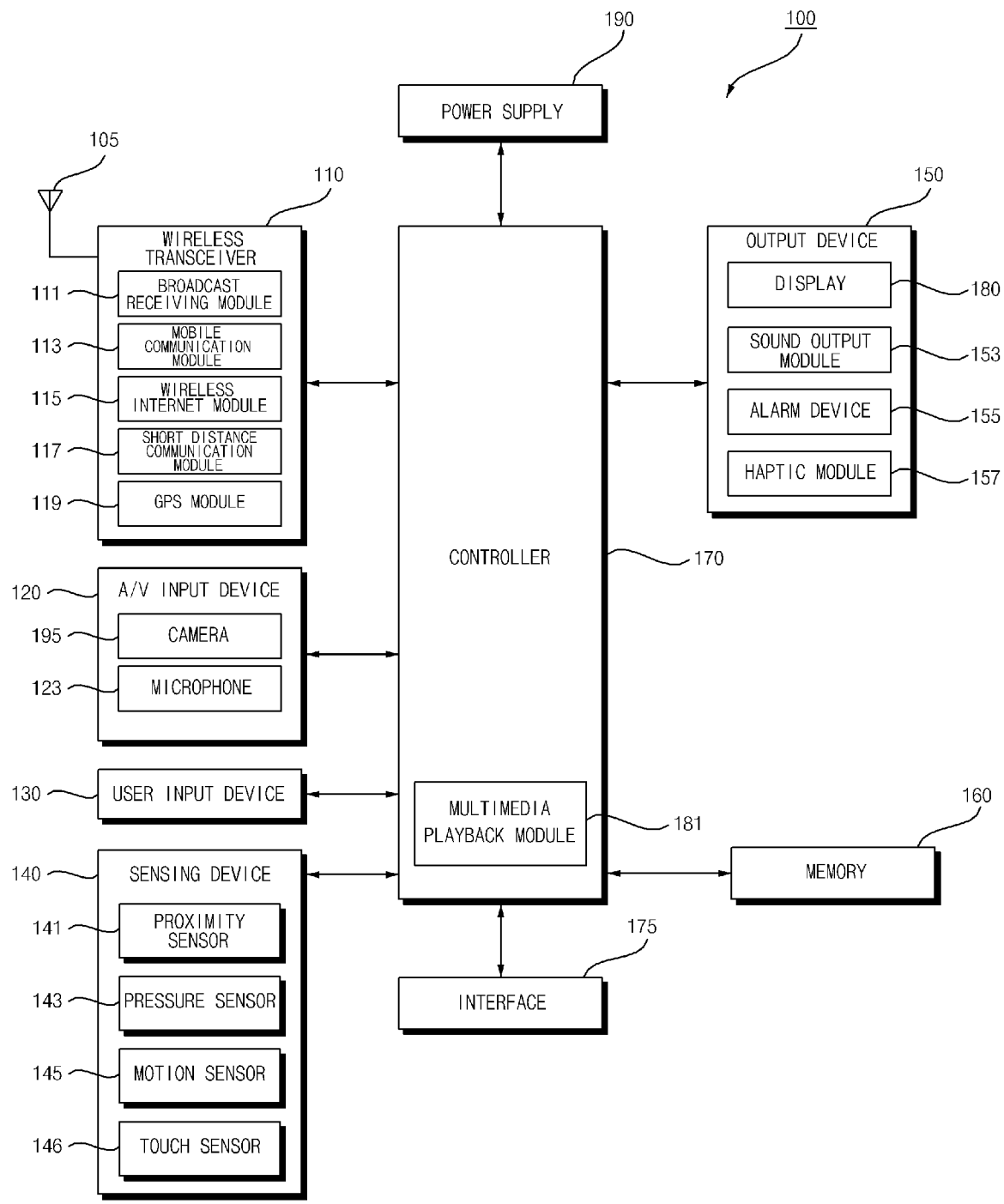
FIG. 2 is a block diagram of the mobile terminal of FIG. 1A or 1B.

FIG. 2 is a block diagram of the mobile terminal of FIG. 1A or 1B.

Referring to FIG. 2, the mobile terminal 100 may include a wireless transceiver 110, an audio/video (A/V) input device 120, a user input device 130, a sensing device 140, an output device 150, a memory 160, an interface 175, a processor 170, and a power supply 190. When these elements are implemented in an actual application, two or more elements may be combined into one element if necessary, or one element may be divided into two or more elements.

The wireless transceiver 110 may include a broadcast receiver 111, a mobile communication module 113, a wireless Internet module 115, a short distance communication module 117, and a GPS module 119.

The broadcast receiver 111 may receive at least one of a broadcast signal or broadcast related information from an external broadcast management server through a broadcast channel. The broadcast signal and/or broadcast related information received through the broadcast receiver 111 may be stored in the memory 160.

The mobile communication module 113 may transmit and receive a wireless signal to at least one of a base station, an external terminal, or a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. BLUETOOTH, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input device 120 may be used to input an audio signal or a video signal, and may include a camera device 195, the microphone 123, and the like.

The camera device 195 may process an image frame such as a still image or a moving image acquired by an image sensor in a video call mode or a photographing mode. Then, the processed image frame may be displayed on the display 180.

The image frame processed by the camera device 195 may be stored in the memory 160 or transmitted to the outside through the wireless transceiver 110. Two or more cameras 195 may be provided according to the configuration of the electronic apparatus.

The microphone 123 may receive an external audio signal by a microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the processor 170, or the like.

The user input device 130 may generate key input data that the user inputs for controlling the operation of the electronic apparatus. The user input device 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing device 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing device 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for sensing position information and intensity information of the touch input. A sensing signal sensed by the touch sensor 146 may be transmitted to the processor 170.

The output device 150 may be used to output an audio signal, a video signal, or an alarm signal. The output device 150 may include a display 180, a sound output device 153, an alarm device 155, and a haptic device 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output device 153 may output the audio data received from the wireless transceiver 110 or stored in the memory 160 in a call signal reception, a call mode or a recording mode, a voice recognition mode, a broadcast reception mode, and the like. In addition, the sound output device 153 may output an audio signal related to the function performed in the mobile terminal 100, e.g., a call signal reception tone, a message reception tone, and the like. The sound output device 153 may include a speaker, a buzzer, and the like.

The alarm device 155 may output a signal for notifying the occurrence of an event of the mobile terminal 100. The alarm device 155 may output a signal for notifying the occurrence of an event in a different form from an audio signal or a video signal. For example, it is possible to output a signal in a form of vibration.

The haptic device 157 may generate various tactile effects that the user can feel. A typical example of the tactile effect generated by the haptic device 157 may be a vibration effect. When the haptic device 157 generates vibration with a tactile effect, the intensity and pattern of the vibration generated by the haptic device 157 can be converted, and different vibrations may be synthesized to be outputted or may be sequentially outputted.

The memory 160 may store a program for the processing and controlling of the processor 170, and may serve to temporarily store inputted or outputted data (e.g., a phone book, a message, a still image, a moving image, or the like).

The interface 175 may serve as an interface with all external apparatuses connected to the mobile terminal 100. The interface 175 may receive data from an external apparatus or receive power from the external apparatus to transmit to each element in the mobile terminal 100, and allow the data in the mobile terminal 100 to be transmitted to the external apparatus.

The processor 170 may control, in general, the operation of each unit to control the overall operation of the mobile terminal 100. For example, the processor 170 may perform relevant control and processing for voice call, data communication, video call, and the like. In addition, the processor 170 may include a multimedia playback module 181 for playing multimedia. The multimedia playback module 181 may be configured in hardware inside the processor 170 or may be configured in software separately from the processor 170. Meanwhile, the processor 170 may include an application processor (not shown) for driving an application. Alternatively, the application processor (not shown) may be provided separately from the processor 170.

The power supply 190 may receive external power or internal power under the control of the processor 170 to supply power required for operation of each element.

Figure 3:
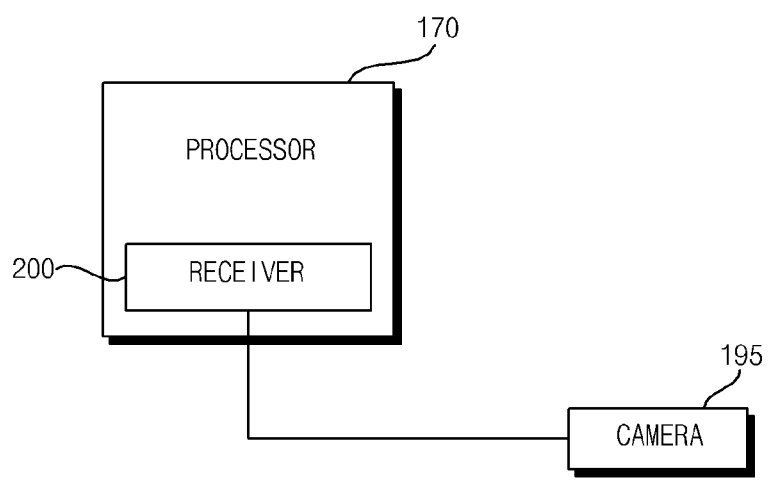
FIG. 3 is a diagram illustrating a processor and a camera of FIG. 2.

FIG. 3 is a diagram illustrating the processor and the camera of FIG. 2.

Referring to the figure, data may be exchanged between the processor 170 and the camera 195.

In particular, an image signal from the camera 195 may be transmitted to the processor 170.

For signal transmission and signal reception between these internal devices, mobile industry processor interface (MIPI) communication may be used.

Accordingly, it is desirable that the processor 170 include a signal receiver 200 for MIPI communication.

In MIPI communication, C-PHY and D-PHY types may be interchangeably used, and when C-PHY and D-PHY types are interchangeably used, it is desirable to use the signal receiver 200 including an interface circuit to which two standards for both types are applicable during signal transmission and signal reception between devices.

Figure 4:
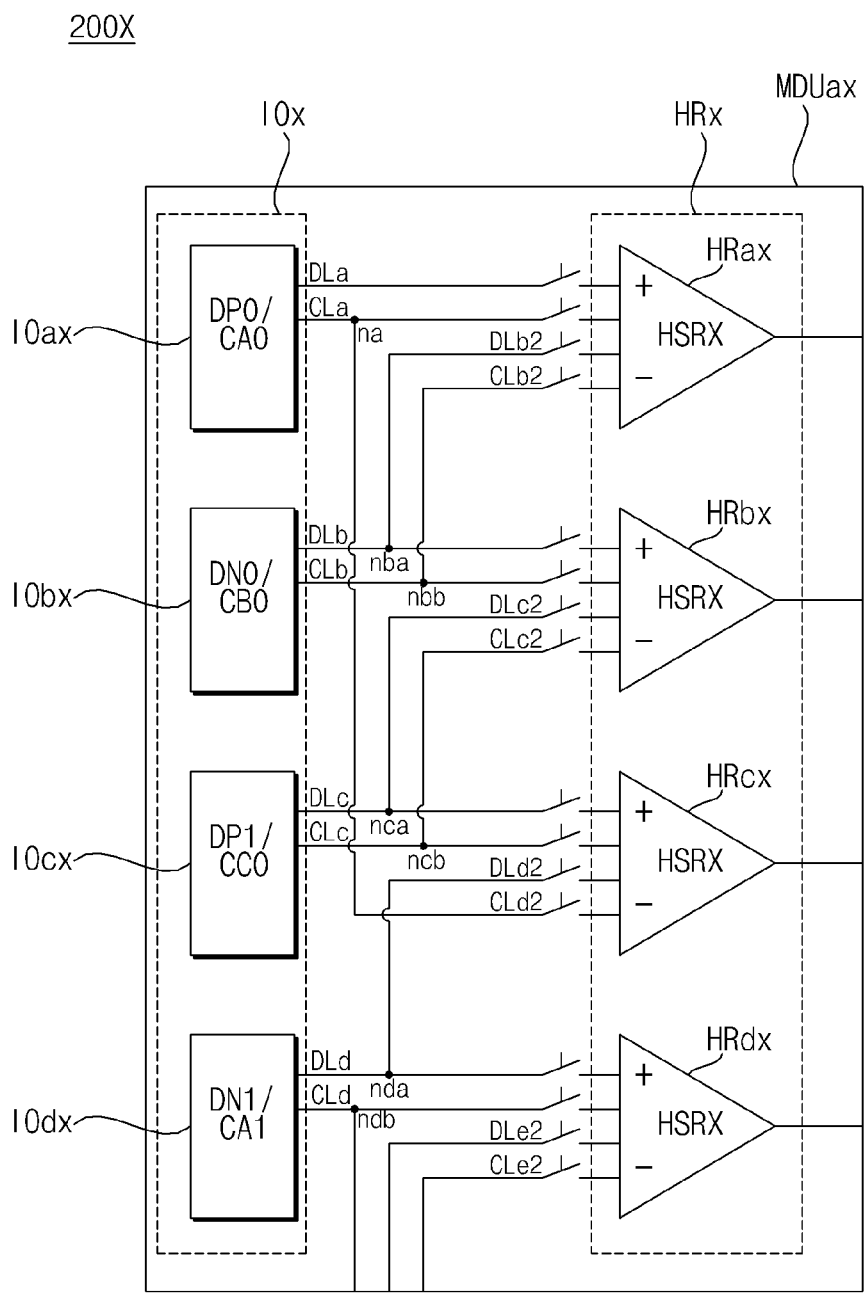
FIGS. 4 and 5 are diagrams illustrating a signal receiver relating to the present disclosure.
Figure 5:
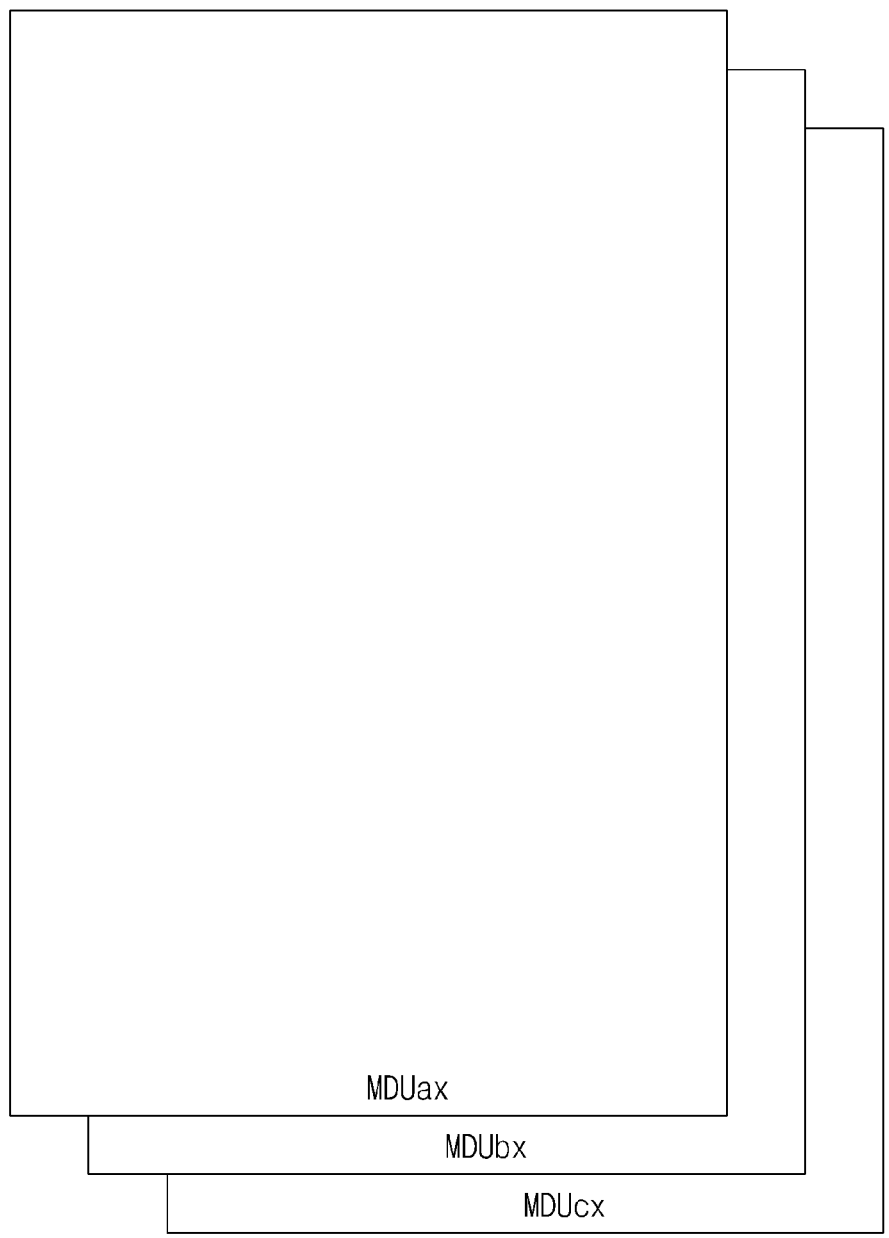

FIGS. 4 and 5 are diagrams illustrating a signal receiver relating to the present disclosure.

FIG. 4 illustrates an example of a signal receiver relating to the present disclosure.

Referring to the figure, the signal receiver 200X includes first to fourth input interfaces IOax to IOdx, first to fourth buffers HRax to HRdx, and a plurality of switching elements in order to receive and process C-PHY or D-PHY type signals.

In particular, four switching elements are used between the input interfaces and the buffers.

Wires DLax to DLdx through which a D-PHY signal which is a first type signal is output and wires CLax to CLdx through which a C-PHY signal which is a second type signal is output are connected to output terminals of the first to fourth input interfaces IOax to IOdx.

That is, two wires are connected to each of the output terminals of the first to fourth input interfaces IOax to IOdx.

In addition, two first type wires DLa and DLb2 and two second type wires CLa and CLb2 are connected to an input terminal of the first buffer HEax, two first type wires DLb and DLc2 and two second type wires CLb and CLc2 are connected to an input terminal of the second buffer HEbx, two first type wires DLc and DLd2 and two second type wires CLc and CLd2 are connected to an input terminal of the third buffer HEcx, and two first type wires DLd and DLe2 and two second type wires CLd and CLe2 are connected to an input terminal of the fourth buffer HEdx.

Meanwhile, three lanes are required when a C-PHY type (second type) signal is input and thus the signal receiver operates in a C-PHY mode (second type mode), and two lanes are required when a D-PHY type (first type) signal is input and thus the signal receiver operates in a D-PHY mode (the first type mode).

Accordingly, in the signal receiver 200X of FIG. 4, the first to third buffers HRax to HRcx need to operate during C-PHY mode operation. In this case, the fourth buffer HRdx may also operate for operation associated with a fifth input interface (not shown).

To this end, only some of the 16 switching elements in the figure need to operate.

During D-PHY mode operation, the first buffer HRax and the third buffer ~HRcx need to operate. To this end, only some of the 16 switching elements in the figure need to operate.

According to FIG. 4, since a plurality of separate switching elements are provided between the first to fourth input interfaces IOax to IOdx and the first to fourth buffers HRax to HRdx, a wiring structure is complicated.

In addition, the circuit becomes complicated because two wires need to be connected to each of the output terminals of the first to fourth input interfaces IOax to IOdx.

FIG. 5 illustrates a signal receiver 200TX including a plurality of interface modules MDUax to MDUcx including the first to fourth input interfaces IOax to IOdx and the first to fourth buffers HRax to HRdx of FIG. 4.

As described with reference to FIG. 4, the signal receiver 200TX includes a plurality of separate switching elements and thus has a considerably complicated wiring structure.

Accordingly, the present disclosure proposes a signal receiver capable of simply implementing a circuit for receiving a plurality of types of signals in order to solve the problems of FIGS. 4 and 5. In particular, the present disclosure proposes a signal receiver capable of simply implementing a circuit for receiving a plurality of types of signals without separate switching elements. This will be described below with reference to FIG. 6.

Figure 6:
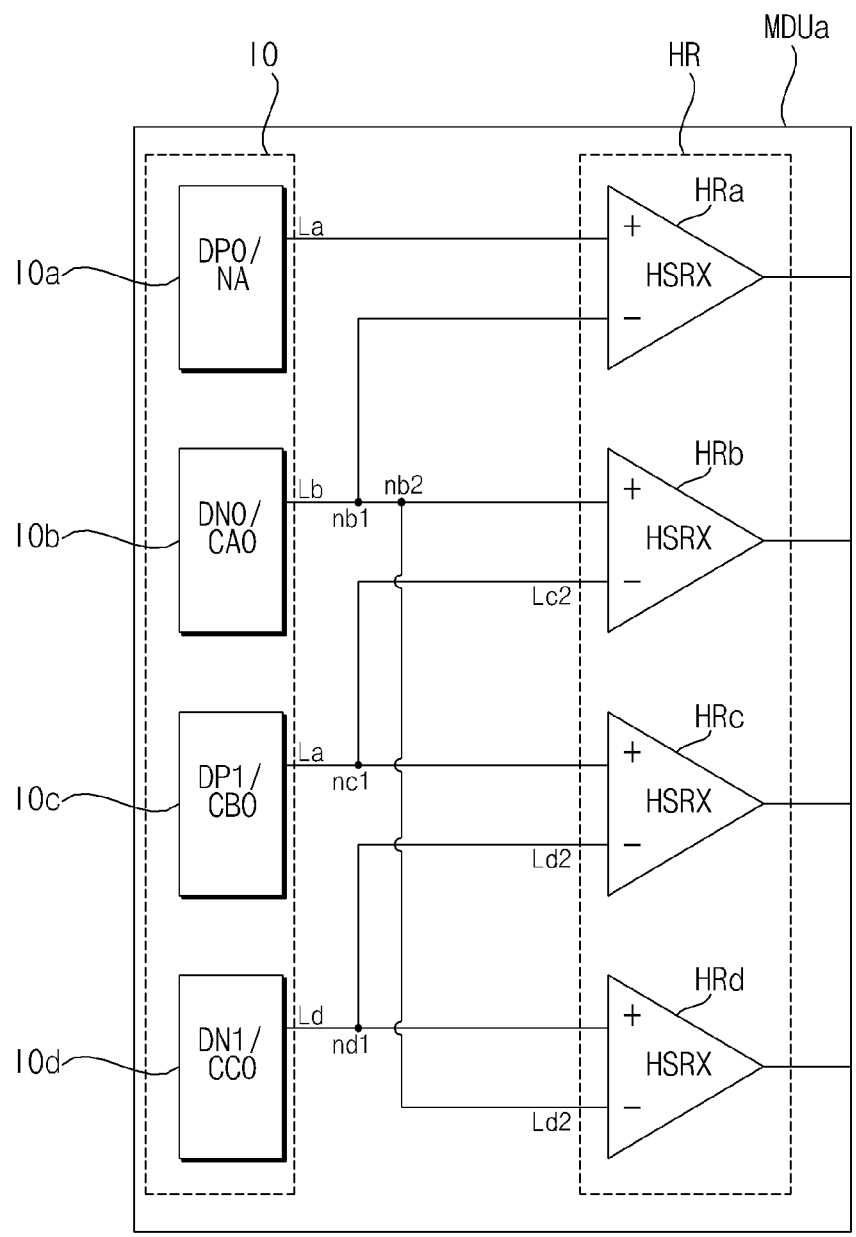
FIG. 6 is an example of a circuit diagram of a signal receiver according to an embodiment of the present disclosure.

FIG. 6 is an example of a circuit diagram of a signal receiver according to an embodiment of the present disclosure, and FIGS. 7A to 8B are diagrams referred to in the description of FIG. 6.

Referring to FIG. 6, the signal receiver 200b according to an embodiment of the present disclosure includes a first input interface IOa that outputs a first type signal between the first type signal and a second type signal, a second input interfaces IOb to a fourth input interfaces IOd that output the first type signal or the second type signal, a first buffer HRa electrically connected to the first input interface IOa and the second input interface IOb, a second buffer HRb electrically connected to the second input interface IOb and the third input interface IOc, a third buffer HRc electrically connected to the third input interface IOc and the fourth input interface IOd, and a fourth buffer HRd electrically connected to the fourth input interface IOd and the second input interface IOb. Accordingly, it is possible to simply implement a circuit for receiving a plurality of types of signals.

Further, wires La to Ld are respectively connected to the output terminals of the first to fourth input interfaces IOa to IOd. Accordingly, it is possible to simply implement a circuit for receiving a plurality of types of signals. In particular, it is possible to simply implement a circuit for receiving a plurality of types of signals without separate switching elements.

Each of the first to fourth buffers HRa to HRd includes a first input terminal (positive terminal) and a second input terminal (negative terminal), and wires (La, Lb), (Lb, Lc2), (Lc, Ld2) and (Ld, Ld2) are respectively connected to the first input terminals (positive terminals) and the second input terminals (negative terminals. Accordingly, it is possible to simply implement a circuit for receiving a plurality of types of signals.

Further, a first node nb1 between the second input interface IOb and the second buffer HRb is electrically connected to the first input interface IOa, a second node nb2 between the second input interface IOb and the second buffer HRb is electrically connected to the fourth input interface IOd, a third node nc1 between the third input interface IOc and the third buffer HRc is electrically connected to the second input interface IOb, and a fourth node nd1 between the fourth input interface IOd and the fourth buffer HRd is electrically connected to the third input interface IOc. Accordingly, it is possible to simply implement a circuit for receiving a plurality of types of signals.

Meanwhile, when the signal receiver operates in the first type mode according to a first type signal, the first to fourth input interfaces IOa to IOd output the first type signal, the first buffer HRa and the third buffer HRc operate, and the second buffer HRb and the fourth buffer HRd do not operate.

When the signal receiver operates in the second type mode according to a second type signal, the second to fourth input interfaces IOb to IOd output the second type signal, the second to fourth buffers HRb to HRd operate, and the first buffer HRa does not operate.

Here, the first type of signal may be a D-PHY signal, and the second type of signal may be a C-PHY signal.

As described above, two lanes are required in response of operation in the first type mode (D-PHY mode) based on the first type (D-PHY) signal, and three lanes are required in response of operation in the second type mode (C-PHY mode) based on the second type (C-PHY) signal.

Therefore, it is desirable that only two of the first to fourth buffers HRa to HRd operate when the signal receiver operates in the first type mode based on the first type signal and three of the first to fourth buffers HRa to HRd operate when the signal receiver operates in the second type mode based on the second type signal.

Meanwhile, the wires La to Ld are respectively connected to the output terminals of the first to fourth input interfaces IOa to IOd. Accordingly, it is possible to simply implement a circuit for receiving a plurality of types of signals. In particular, it is possible to simply implement a circuit for receiving a plurality of types of signals without separate switching elements.

Each of the first to fourth buffers HRa to HRd has the first input terminal (positive terminal) and the second input terminal (negative terminal), and one wire is connected to each of the first input terminal (positive terminal) and the second input terminal (negative terminal). Accordingly, it is possible to simply implement a circuit for receiving a plurality of types of signals.

Further, the first node nb1 between the second input interface IOb and the second buffer HRb is electrically connected to the first input interface IOa, the second node nb2 between the second input interface IOb and the second buffer HRb is electrically connected to the fourth input interface IOd, the third node nc1 between the third input interface IOc and the third buffer HRc is electrically connected to the second input interface IOb, and the fourth node nd1 between the fourth input interface IOd and the fourth buffer HRd is electrically connected to the third input interface IOc. Accordingly, it is possible to simply implement a circuit for receiving a plurality of types of signals.

Figure 7A:
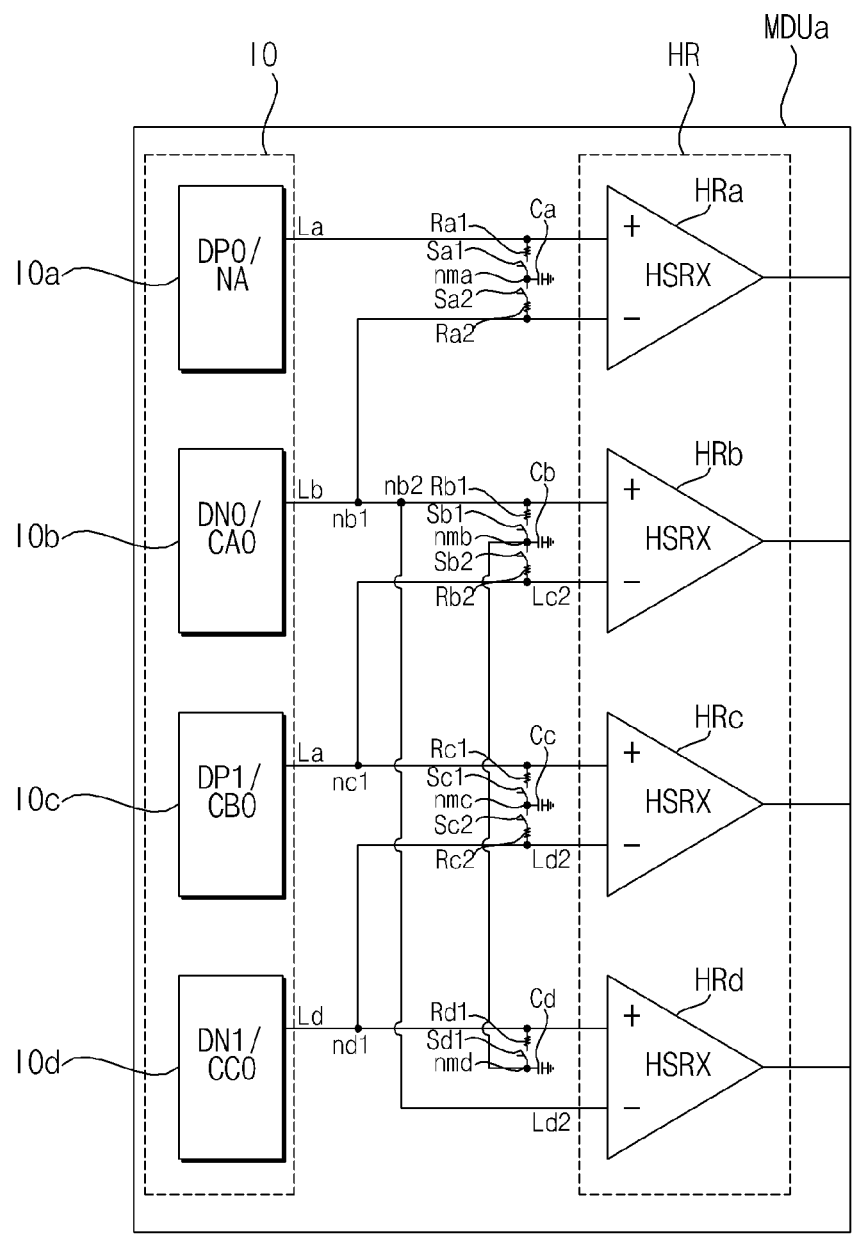
FIGS. 7A to 8B are diagrams referred to in the description of FIG. 6.

FIG. 7A illustrates another example of a circuit diagram of a signal receiver 200*b* according to an embodiment of the present disclosure.

Referring to the figure, the signal receiver 200*b* of FIG. 7 is similar to the signal receiver 200*b* of FIG. 6, but differs from the signal receiver 200*b* of FIG. 6 in that two resistor elements and two switching elements are symmetrically connected between the first input terminal (positive terminal) and the second input terminal (negative terminal) of each of the first buffers HRa to the third buffers HRc, and one resistor element and one switching element are connected to the first input terminal (positive terminal) of the fourth buffer HRd.

Further, a capacitor is connected between a node between the first input terminal (positive terminal) and the second input terminal (negative terminal) of each of the first to fourth buffers HRa to HRd and a ground terminal. Accordingly, it is possible to simply implement a circuit for receiving a plurality of types of signals.

In the figure, a resistor element Ra1, a switching element Sa1, a switching element Sa2, and a resistor element Ra2 are connected between the first input terminal (positive terminal) and the second input terminal (negative terminal) of the first buffer HRa, and a capacitor Ca is connected between a node nma between the switching element Sa1 and the switching element Sa2 and the ground terminal.

In addition, in the figure, a resistor element Rb1, a switching element Sb1, a switching element Sb2, and a resistor element Rb2 are connected between the first input terminal (positive terminal) and the second input terminal (negative terminal) of the second buffer HRb, and a capacitor Cb is connected between a node nmb between the switching element Sb1 and the switching element Sb2 and the ground terminal.

In addition, in the figure, a resistor element Rc1, a switching element Sc1, a switching element Sc2, and a resistor element Rc2 are connected between the first input terminal (positive terminal) and the second input terminal (negative terminal) of the third buffer HRc, and a capacitor Cc is connected between a node nmc between the switching element Sc1 and the switching element Sc2 and the ground terminal.

Further, in the figure, a resistor element Rd1 and a switching element Sd1 are connected between the first input terminal (positive terminal) of the fourth buffer HRd and a node nmd, and a capacitor dd is connected between the node nmd and the ground terminal.

Such resistor elements and switching elements are termination resistor elements and termination switching elements and can reduce signal reflection, circuit loss, heat generation, or voltage inequality.

Figure 7B:
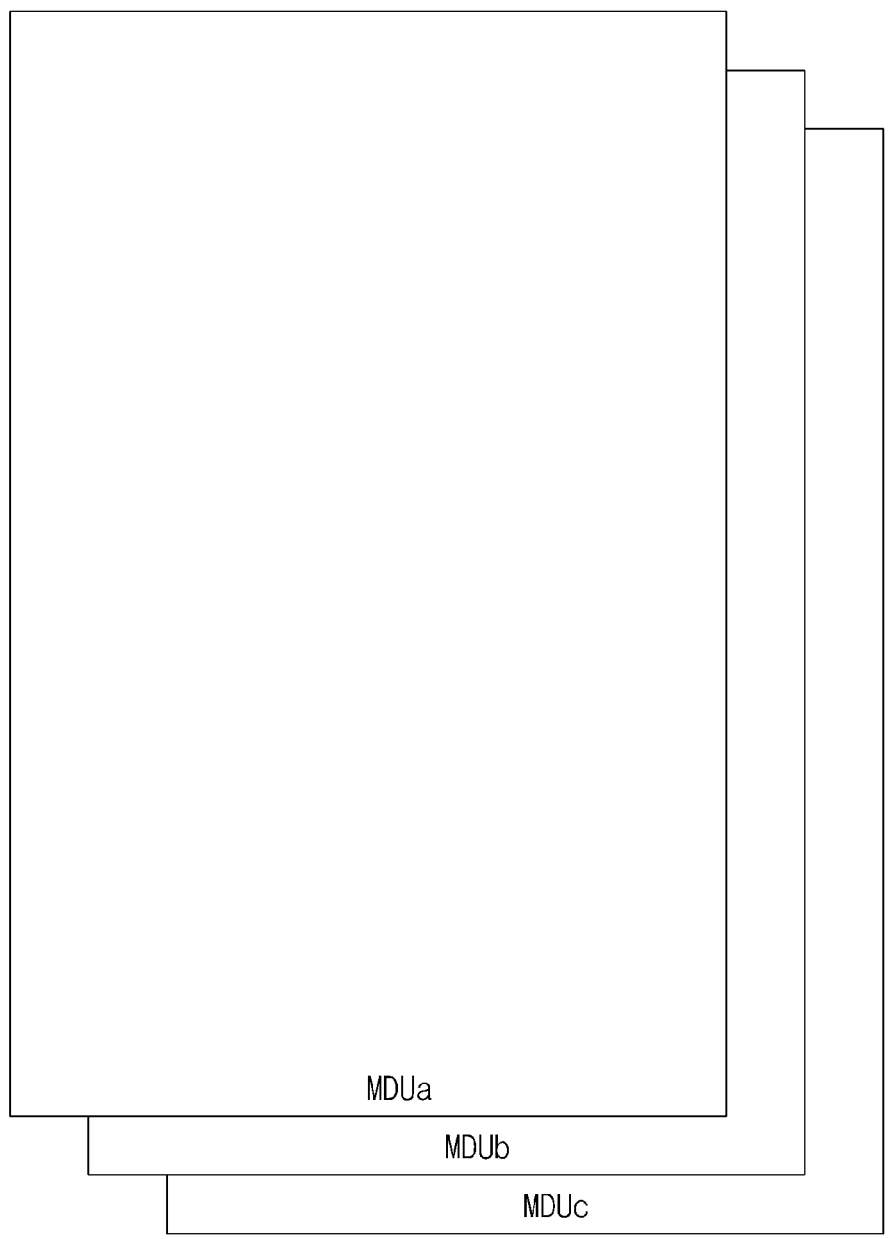

FIG. 7B illustrates a signal receiver 200T according to another embodiment of the present disclosure.

Referring to the figure, the signal receiver 200T may include the first to fourth buffers HRa to HRd each having the first input terminal (positive terminal) and the second input terminal (negative terminal) and the first to fourth input interfaces IOa to IOd of FIG. 7A.

In particular, the signal receiver 200T according to another embodiment of the present disclosure may include a plurality of interface modules MDUa to MDUc each including the first to fourth input interfaces IOa to IOd and the first to fourth buffers HRa to HRd.

Although the figure illustrates three interface modules, the present disclosure is not limited thereto and the signal receiver 200T according to another embodiment of the present disclosure may include a plurality of interface modules. Accordingly, it is possible to implement a signal processing device including the interface modules MDUa to MDUc having excellent scalability.

Figure 8A:
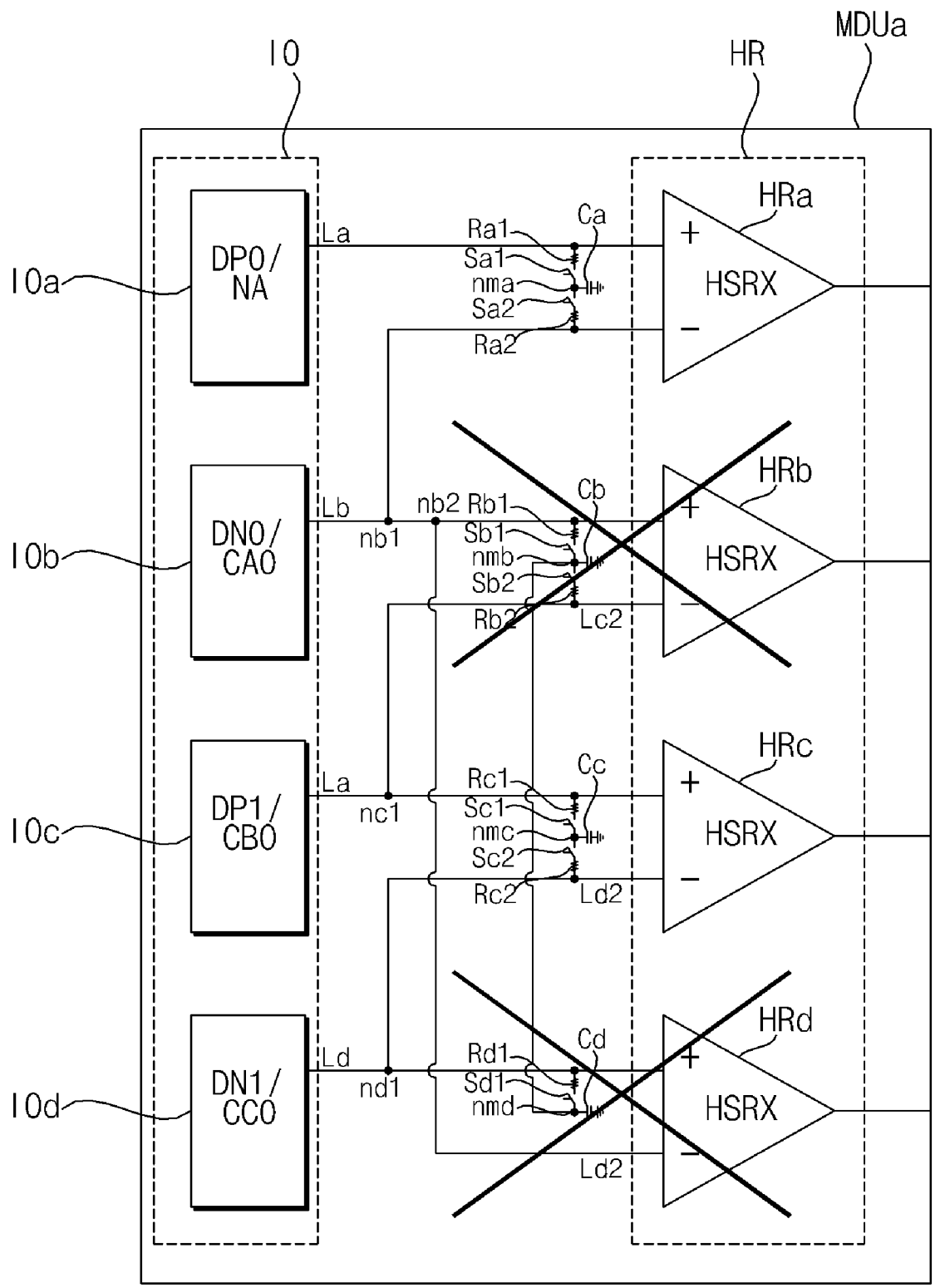

FIG. 8A illustrates operation of the signal receiver 200*b* of FIG. 7A in the first type mode.

Referring to the figure, when a first type signal is input to the signal receiver 200*b* and thus the signal receiver 200*b* operates in the first type mode based on the first type signal, the first to fourth input interfaces IOa to IOd output the first type signal, the first buffer HRa and the third buffer HRc operate, and the second buffer HRb and the fourth buffer HRd do not operate, as shown in FIG. 8A. Accordingly, it is possible to simply implement a circuit for receiving a plurality of types of signals.

Figure 8B:
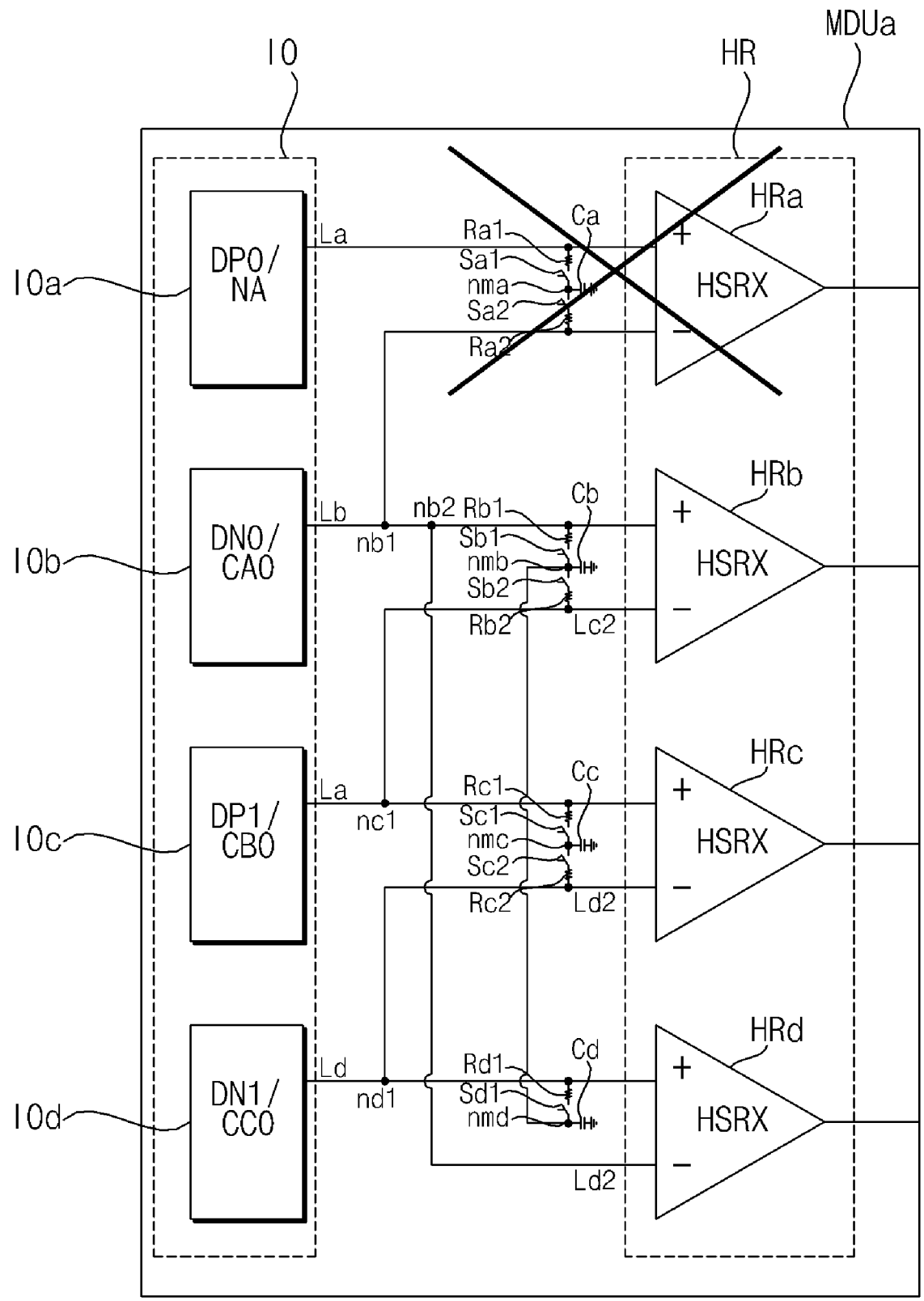

FIG. 8B illustrates operation of the signal receiver 200*b* of FIG. 7A in the second type mode.

Referring to the figure, when a second type signal is input to the signal receiver 200*b* and thus the signal receiver 200*b* operates in the second type mode based on the second type signal, the second to fourth input interfaces IOb to IOd output the second type signal, the second to fourth buffers HRb to HRd operate, and the first buffer HRa does not operate, as shown in FIG. 8B. Accordingly, it is possible to simply implement a circuit for receiving a plurality of types of signals.

Referring to FIGS. 8A and 8B in combination, the signal receiver 200*b* according to another embodiment of the present disclosure includes the first to fourth buffers HRa to HRd each having the first input terminal (positive terminals) and the second input terminal (negative terminal), the first input interface IOa outputting the first type signal between the first type signal and the second type signal to the first buffer HRa, and the second input interface IOb to the fourth input interface IOd outputting the first type signal or the second type signal to the second to fourth buffers HRb to HRd, wherein two of the first to fourth buffers HRa to HRd operate in response of operation in the first type mode based on the first type signal, and three of the first to fourth buffers HRa to HRd operate in response of operation in the second type mode based on the second type signal. Accordingly, it is possible to simply implement a circuit for receiving a plurality of types of signals. In particular, it is possible to simply implement a circuit for receiving a plurality of types of signals without separate switching elements.

For example, when the signal receiver 200b operates in the first type mode based on the first type signal, as shown in FIG. 8A, the first buffer HRa and the third buffer HRc operate and the second buffer HRb and the fourth buffer HRd do not operate. When the signal receiver 200b operates in the second type mode based on the second type signal, as shown in FIG. 5B, the second to fourth buffers HRb to HRd operate and the first buffer HRa does not operate. Accordingly, it is possible to simply implement a circuit for receiving a plurality of types of signals.

Meanwhile, the first buffer HRa and the third buffer HRc may output the first type signal, and the second to fourth buffers HRb to HRd may output the second type signal. Accordingly, it is possible to simply implement a circuit for receiving a plurality of types of signals.

Figure 9:
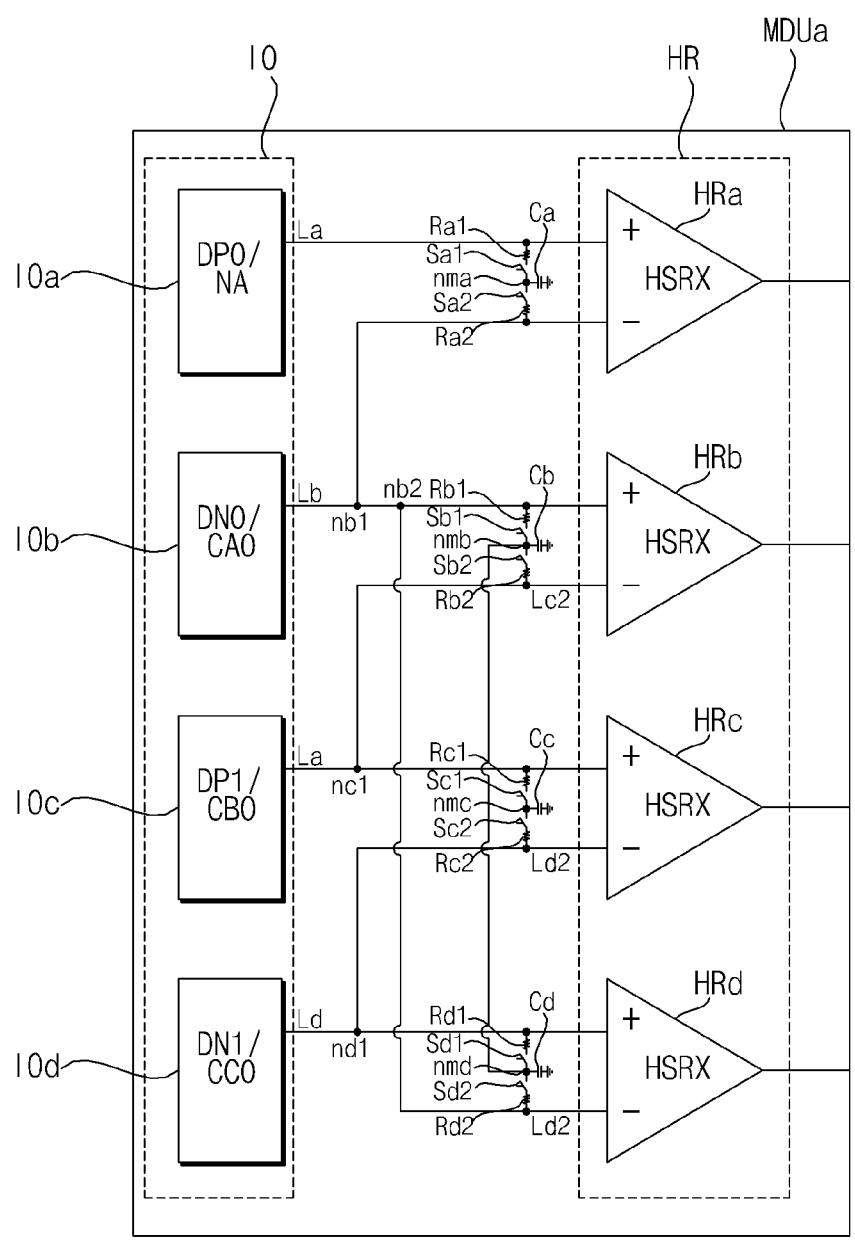
FIG. 9 is an exemplary circuit diagram of a signal receiver according to another embodiment of the present disclosure.

FIG. 9 is an example of a circuit diagram of a signal receiver according to another embodiment of the present disclosure.

Referring to the figure, the signal receiver 200c of FIG. 9 includes the first to fourth input interfaces IOa to IOd and the first to fourth buffers HRa to HRd, similarly to FIG. 7A.

In addition, in the signal receiver 200c of FIG. 9, two resistor elements and two switching elements are symmetrically connected between the first input terminal (positive terminal) and the second input terminal (negative terminal) of each of the first to fourth buffers HRa to HRd.

In particular, the signal receiver 200c differs from the signal receiver of FIG. 7A in that two resistor elements and two switching elements are symmetrically connected between the first input terminal (positive terminal) and the second input terminal (negative terminal) of the fourth buffer HRa.

Further, a capacitor is connected between a node between the first input terminal (positive terminal) and the second input terminal (negative terminal) of each of the first to fourth buffers HRa to HRd and the ground terminal. Accordingly, it is possible to simply implement a circuit for receiving a plurality of types of signals.

In the figure, a resistor element Ra1, a switching element Sa1, a switching element Sa2, and a resistor element Ra2 are connected between the first input terminal (positive terminal) and the second input terminal (negative terminal) of the first buffer HRa, and a capacitor Ca is connected between a node nma between the switching element Sa1 and the switching element Sa2 and the ground terminal.

Further, in the figure, a resistor element Rb1, a switching element Sb1, a switching element Sb2, and a resistor element Rb2 are connected between the first input terminal (positive terminal) and the second input terminal (negative terminal) of the second buffer HRb, and a capacitor Cb is connected between a node nmb between the switching element Sb1 and the switching element Sb2 and the ground terminal.

In addition, in the figure, a resistor element Rc1, a switching element Sc1, a switching element Sc2, and a resistor element Rc2 are connected between the first input terminal (positive terminal) and the second input terminal (negative terminal) of the third buffer HRc, and a capacitor Cc is connected between a node nmc between the switching element Sc1 and the switching element Sc2 and the ground terminal.

Further, in the figure, a resistor element Rd1, a switching element Sd1, a switching element Sd2, and a resistor element Rd2 are connected between the first input terminal (positive terminal) and the second input terminal (negative terminal) of the fourth buffer HRd, and a capacitor dd is connected between a node nmd between the switching element Sd1 and the switching element Sd2 and the ground terminal.

Such resistor elements and switching elements are termination resistor elements and termination switching elements and can reduce signal reflection, circuit loss, heat generation, or voltage inequality.

Meanwhile, the first buffer HRa and the third buffer HRc may output the first type signal, and the second to fourth buffers HRb to HRd may output the second type signal. Accordingly, it is possible to simply implement a circuit for receiving a plurality of types of signals.

Meanwhile, the signal processing device described with reference to FIGS. 6 to 9 can be employed for a processor or the like in an electronic apparatus. In this case, the electronic apparatus may be exemplified by a mobile terminal 100 of FIG. 2, a vehicle, a TV, a monitor, a notebook computer, a tablet, a drone, a robot, a robot cleaner, or a door. Preferred embodiments of the present disclosure have been described with reference to appended drawings. However, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

What is claimed is:

1. A signal receiver for receiving a signal from an external device, the signal receiver comprising:
   a first input interface configured to output a first type signal between the first type signal and a second type signal;
   second to fourth input interfaces configured to output the first type signal or the second type signal;
   a first buffer electrically connected to the first input interface and the second input interface;
   a second buffer electrically connected to the second input interface and the third input interface;
   a third buffer electrically connected to the third input interface and the fourth input interface; and
   a fourth buffer electrically connected to the fourth input interface and the second input interface.

2. The signal receiver of claim 1, wherein a wire is connected to an output terminal of each of the first to fourth input interfaces.

3. The signal receiver of claim 1, wherein each of the first to fourth buffers each includes a first input terminal and a second input terminal,
   wherein a wire is connected to each of the first input terminal and the second input terminal.

4. The signal receiver of claim 1, wherein a first node between the second input interface and the second buffer is electrically connected to the first input interface,
  a second node between the second input interface and the second buffer is electrically connected to the fourth input interface,
  a third node between the third input interface and the third buffer is electrically connected to the second input interface, and
  a fourth node between the fourth input interface and the fourth buffer is electrically connected to the third input interface.

5. The signal receiver of claim 1, wherein, in response of operation in a first type mode based on the first type signal, the first to fourth input interfaces output the first type signal, the first buffer and the third buffer operate, and the second buffer and the fourth buffer do not operate.

6. The signal receiver of claim 1, wherein, in response of operation in a second type mode based on the second type signal, the second to fourth input interfaces output the second type signal, the second to fourth buffers operate, and the first buffer does not operate.

7. The signal receiver of claim 1, comprising a plurality of interface modules each including the first to fourth input interfaces and the first to fourth buffers.

8. The signal receiver of claim 1, wherein two resistor elements and two switching elements are symmetrically connected between the first input terminal and the second input terminal of each of the first to third buffers, and one resistor element and one switching element are connected to the first input terminal of the fourth buffer.

9. The signal receiver of claim 8, wherein a capacitor is connected between a node between the first input terminal and the second input terminal of each of the first to fourth buffers and a ground terminal.

10. The signal receiver of claim 1, wherein two resistor elements and two switching elements are symmetrically connected Between the first input terminal and the second input terminal of each of the first to fourth buffers.

11. The signal receiver of claim 10, wherein a capacitor is connected between a node between the first input terminal and the second input terminal of each of the first to fourth buffers and the ground terminal.

12. A signal receiver for receiving a signal from an external device, the signal receiver comprising:
  first to fourth buffers each including a first input terminal and a second input terminal;
  a first input interface configured to output a first type signal between the first type signal and a second type signal to the first buffer; and
  second to fourth input interfaces configured to output the first type signal or the second type signal to the second to fourth buffers, respectively,
  wherein two of the first to fourth buffers operate in response of operation in a first type mode based on the first type signal, and three of the first to fourth buffers operate in response of operation in a second type mode based on the second type of signal.

13. The signal receiver of claim 12, wherein the first buffer and the third buffer operate and the second buffer and the fourth buffer do not operate in response of operation in the first type mode based on the first type signal, and
  the second to fourth buffers operate and the first buffer does not operate in response of operation in the second type mode based on the second type signal.

14. The signal receiver of claim 12, wherein the first buffer and the third buffer output the first type signal, and the second to fourth buffers output the second type signal.

15. An electronic apparatus comprising a signal receiver for receiving a signal from an external device,
  wherein the electronic apparatus comprising:
  a first input interface configured to output a first type signal between the first type signal and a second type signal;
  second to fourth input interfaces configured to output the first type signal or the second type signal;
  a first buffer electrically connected to the first input interface and the second input interface;
  a second buffer electrically connected to the second input interface and the third input interface;
  a third buffer electrically connected to the third input interface and the fourth input interface; and
  a fourth buffer electrically connected to the fourth input interface and the second input interface.

16. The electronic apparatus of claim 15, further comprising:
  a camera; and
  a processor,
  wherein the signal receiver is included in the processor and receives a signal from the camera.

17. The electronic apparatus of claim 15, wherein a wire is connected to an output terminal of each of the first to fourth input interfaces.

18. The electronic apparatus of claim 15, wherein each of the first to fourth buffers each includes a first input terminal and a second input terminal,
  wherein a wire is connected to each of the first input terminal and the second input terminal.

19. The electronic apparatus of claim 15, wherein a first node between the second input interface and the second buffer is electrically connected to the first input interface,
  a second node between the second input interface and the second buffer is electrically connected to the fourth input interface,
  a third node between the third input interface and the third buffer is electrically connected to the second input interface, and
  a fourth node between the fourth input interface and the fourth buffer is electrically connected to the third input interface.

20. The electronic apparatus of claim 15, wherein, in response of operation in a first type mode based on the first type signal, the first to fourth input interfaces output the first type signal, the first buffer and the third buffer operate, and the second buffer and the fourth buffer do not operate,
  wherein, in response of operation in a second type mode based on the second type signal, the second to fourth input interfaces output the second type signal, the second to fourth buffers operate, and the first buffer does not operate.

* * * * *